United States Patent
Schober et al.

(10) Patent No.: US 10,343,652 B2
(45) Date of Patent: Jul. 9, 2019

(54) WIPER DEVICE FOR CLEANING VEHICLE WINDOWS, AND CLEANING ARRANGEMENT FOR A WIPER DEVICE

(71) Applicant: Valeo Systèmes d'Essuyage, Le Mesnil Saint Denis (FR)

(72) Inventors: Claudia Schober, Marbach (DE); Siegfried Waible, Flein (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/258,370

(22) Filed: Sep. 7, 2016

(65) Prior Publication Data

US 2017/0066418 A1    Mar. 9, 2017

(30) Foreign Application Priority Data

Sep. 7, 2015    (DE) .................. 10 2015 114 923

(51) Int. Cl.
 *B60S 1/38*    (2006.01)
 *B60S 1/40*    (2006.01)
 (Continued)

(52) U.S. Cl.
 CPC ............. *B60S 1/522* (2013.01); *B60S 1/3856* (2013.01); *B60S 1/4048* (2013.01); *B60S 1/42* (2013.01);
 (Continued)

(58) Field of Classification Search
 CPC ........ B60S 1/522; B60S 1/524; B60S 1/3862; B60S 1/3882; B60S 1/3856
 (Continued)

(56) References Cited

U.S. PATENT DOCUMENTS 2,432,690 A * 12/1947 Smulski .................... B60S 1/40
  15/250.04
6,658,690 B1 * 12/2003 Westermann ......... B60S 1/4006
  15/250.32
(Continued)

FOREIGN PATENT DOCUMENTS

CN    101125543 A    2/2008
DE    102004007351 A1    9/2005
(Continued)

OTHER PUBLICATIONS

Search Report Issued in Corresponding German Application No. 10 2015 114 923.0, dated Jul. 14, 2016 (7 Pages).
(Continued)

*Primary Examiner* — Andrew A Horton
(74) *Attorney, Agent, or Firm* — Osha Liang LLP

(57) ABSTRACT

The invention relates to a wiper device (100) for cleaning vehicle windows, with a wiper arm (10; 10a-10d) and a wiper blade (1) able to be fastened to the wiper arm (10; 10a-10d), with a cleaning arrangement (40; 40a-40d) having at least one first spray nozzle (42, 43) for spraying a washing fluid, wherein the cleaning arrangement (40; 40a-40d) is connected directly with the wiper arm (10; 10a-10d), and with a fastening arrangement (2) for connecting the wiper blade (1) with the wiper arm (10; 10a-10d), wherein the cleaning arrangement (40; 40a-40d) is constructed as a separate component from the fastening arrangement (2) for the wiper blade (1).

14 Claims, 12 Drawing Sheets

(51) Int. Cl.
*B60S 1/42* (2006.01)
*B60S 1/48* (2006.01)
*B60S 1/52* (2006.01)

(52) U.S. Cl.
CPC ............ *B60S 1/488* (2013.01); *B60S 1/3862* (2013.01); *B60S 2001/4054* (2013.01)

(58) Field of Classification Search
USPC ....................................................... 15/250.04
See application file for complete search history.

(56) References Cited

U.S. PATENT DOCUMENTS

| | | | | |
|---|---|---|---|---|
| 2011/0107541 A1* | 5/2011 | Caillot | ................. | B60S 1/3862 |
| | | | | 15/250.04 |
| 2013/0291328 A1* | 11/2013 | Schmid | ................. | B60S 1/3805 |
| | | | | 15/250.04 |

FOREIGN PATENT DOCUMENTS

| | | | | |
|---|---|---|---|---|
| EP | 3002166 A1 | 4/2016 | | |
| FR | 2752798 A1 | 3/1998 | | |
| FR | 2766777 A1 | 2/1999 | | |
| GB | 2356130 A * | 5/2001 | ............ | B60S 1/4006 |
| WO | 2014061753 A1 | 4/2014 | | |
| WO | 2014102062 A1 | 7/2014 | | |

OTHER PUBLICATIONS

The First Office Action issued in corresponding Chinese Application No. 201610808776.5, dated Jul. 11, 2018 (11 pages).

* cited by examiner

WIPER DEVICE FOR CLEANING VEHICLE WINDOWS, AND CLEANING ARRANGEMENT FOR A WIPER DEVICE

PRIOR ART

The invention relates to a wiper device for cleaning vehicle windows as per the preamble of Claim 1. The invention also relates to a cleaning arrangement for a wiper device.

A wiper device according to the preamble of Claim 1 is known from the subsequently published application with the application number EP 14306557.1. The known wiper device has a cleaning arrangement which is in the form of a separate component and which serves for spraying a cleaning liquid onto a vehicle window. The cleaning arrangement, which is composed of plastic, is fastened to the outer side of the wiper arm in the vicinity of the region in which the wiper blade is fastened to the wiper arm. For this purpose, a click-action or engagement connection is formed between the cleaning arrangement and the wiper arm. To form the engagement connection, the wiper arm has a cutout on a side wall, into which cutout a corresponding projection of the cleaning arrangement projects and engages with the cutout. Furthermore, the cleaning arrangement is connected, within the cross section of the wiper arm, to a liquid hose for the supply of the cleaning liquid to the cleaning arrangement. The cleaning arrangement has at least one spray nozzle which, for example, sprays the cleaning liquid directly in front of the wiper blade.

Owing to the fact that the cleaning arrangement is connected to the outer side of the wiper arm, the cleaning arrangement is exposed to the risk of being inadvertently detached in particular under the action of external mechanical forces such as arise for example when travelling through a car washing installation.

Furthermore, as a result of the fact that the cleaning arrangement is arranged on the side wall of the wiper arm, the possibility for orienting the spray nozzles relative to the vehicle window or relative to the wiper blade is limited. In particular, with a single cleaning arrangement, it is not possible for cleaning liquid to be applied to the vehicle window on both sides of the wiper blade in relation to the longitudinal direction of the wiper blade in order to thereby be able to apply cleaning liquid to the vehicle window in front of the wiper blade in each case, regardless of the direction of movement of the wiper blade.

DISCLOSURE OF THE INVENTION

Proceeding from the prior art presented, the invention is based on the object of further developing a wiper device for cleaning vehicle windows, as per the preamble of Claim 1, such that the abovementioned disadvantages are avoided. In particular, it is the intention to make it possible for the cleaning arrangement to be arranged on the wiper arm in such a way that the cleaning arrangement is arranged in well-protected fashion with regard to external forces acting on the wiper arm. Furthermore, it is the intention to make it possible to realize a wide variety of possible positions of spray nozzles, thus making it possible in particular for cleaning liquid to be applied to the vehicle window in front of the wiper blade in both wiping directions of the wiper blade. Furthermore, it is the intention to make it possible for existing wiper arms to be able to be retrofitted, if necessary, with a cleaning arrangement and a possibly adapted wiper blade with the least possible outlay. It is also the intention for the cross section of the wiper arm in the region of the cleaning arrangement to be enlarged as little as possible.

The above-stated objects are achieved, according to the invention, with a wiper device for cleaning vehicle windows having the features of Claim 1.

The invention is based on the concept of arranging the cleaning arrangement within the cross section of the wiper arm and simultaneously using the cleaning arrangement for fastening or holding the wiper blade, by way of the fastening arrangement thereof, on the wiper arm. In other words, this means that, according to the invention, provision is made whereby, firstly, the cleaning arrangement is connected to the wiper arm and, secondly, a fastening arrangement for the wiper blade is connected to the cleaning arrangement. The cleaning arrangement thus acts in the manner of an intermediate element between the wiper arm and the fastening arrangement of the wiper blade.

Advantageous refinements of the wiper device according to the invention for cleaning vehicle windows are specified in the subclaims. The scope of the invention encompasses all combinations of at least two features disclosed in the claims, in the description and/or in the figures.

To make it possible to realize a particularly protected installation or protected arrangement of the cleaning arrangement, provision is made whereby the separate component which forms the cleaning arrangement and the fastening arrangement for the wiper blade are arranged, at least in certain areas, within a mount of the wiper arm.

In a refinement of the cleaning arrangement which is preferred from a construction aspect, provision is made whereby said cleaning arrangement has a cross section with side walls for forming a mount region for the fastening arrangement of the wiper blade, such that in the mounted state of the cleaning arrangement, firstly, the mount of the wiper arm encompasses the separate component or the cleaning arrangement, and secondly, the mount region of the cleaning arrangement encompasses the fastening arrangement of the wiper blade.

To apply the cleaning liquid over as large an area as possible or to different regions of the vehicle window, provision is made, in a further refinement of the invention, whereby at least one second spray nozzle is provided on the cleaning arrangement, which at least one second spray nozzle is arranged on a side face, different from an end face of the cleaning arrangement, or on an underside of the cleaning arrangement.

In a particularly preferred refinement of the latter proposal, provision is made whereby the cleaning arrangement has respectively at least one second spray nozzle on opposite longitudinal sides. In this way, regardless of the direction of movement of the wiper blade as it passes over the vehicle window, it is ensured that cleaning liquid can be applied to the vehicle window in each case in front of the wiper blade. This has the effect that the obstruction of the driver's view during the cleaning of the vehicle window during travel is minimized.

To make it possible to realize a mechanically particularly robust and exact arrangement of the cleaning arrangement in the wiper arm, provision is made whereby the cleaning arrangement has side walls which are arranged partially flush with the side walls of the mount of the wiper arm.

In order to secure or detachably arrange the wiper blade or the fastening arrangement thereof on the wiper arm in order to enable the wiper blade to be exchanged as easily as possible, provision is made whereby the cleaning arrangement has a through-opening, which in the mounted state of the wiper blade is penetrated by an engagement element of the fastening arrangement of the wiper blade, wherein the engagement element cooperates with an engagement opening on the wiper arm.

In order to make it possible for cleaning liquid to be applied to the vehicle window not only in the region close to the cleaning arrangement but also in the longitudinal direction of the wiper arm in which said wiper arm is arranged in alignment with the wiper blade, a further refinement of the invention provides for the cleaning arrangement to be constructed, on the side facing toward a wiper arm axis, to be connected with an elongated spray body, which has additional spray nozzles.

Further advantages, features and details of the invention will emerge from the following description of a preferred exemplary embodiments and on the basis of the drawing.

Figure 1:
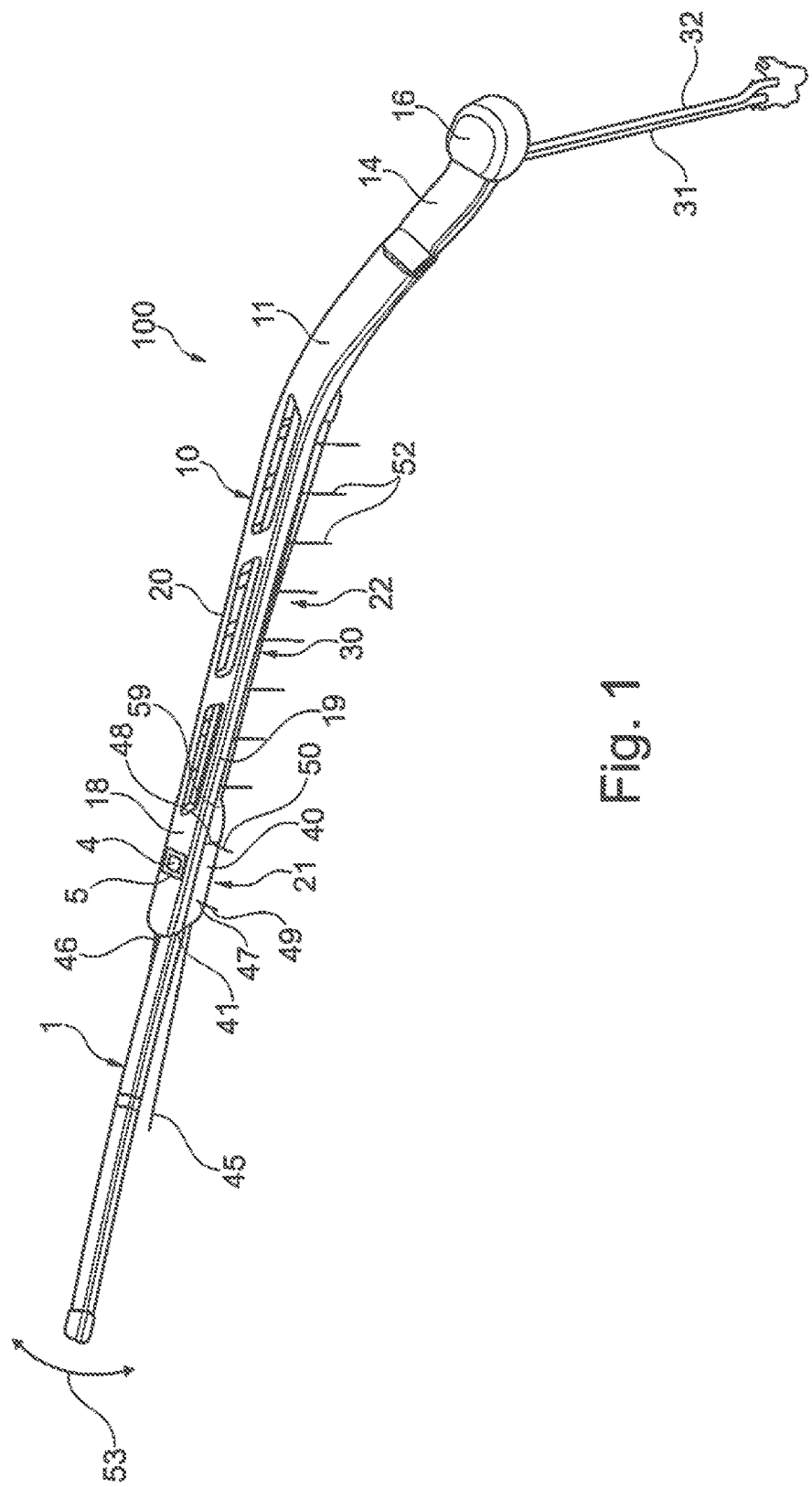
FIG. 1 shows a wiper device for cleaning vehicle windows in a perspective view.
Figure 3:
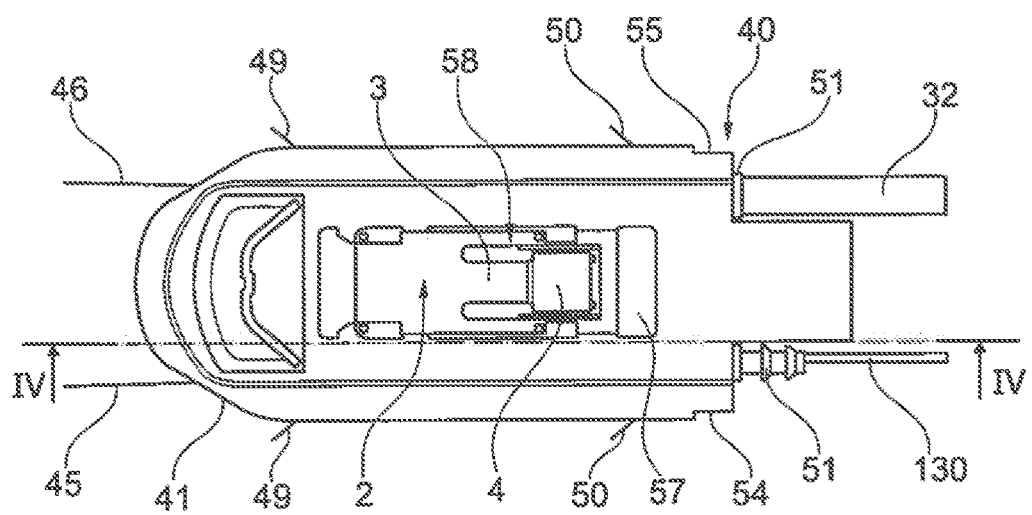
Figure 4:
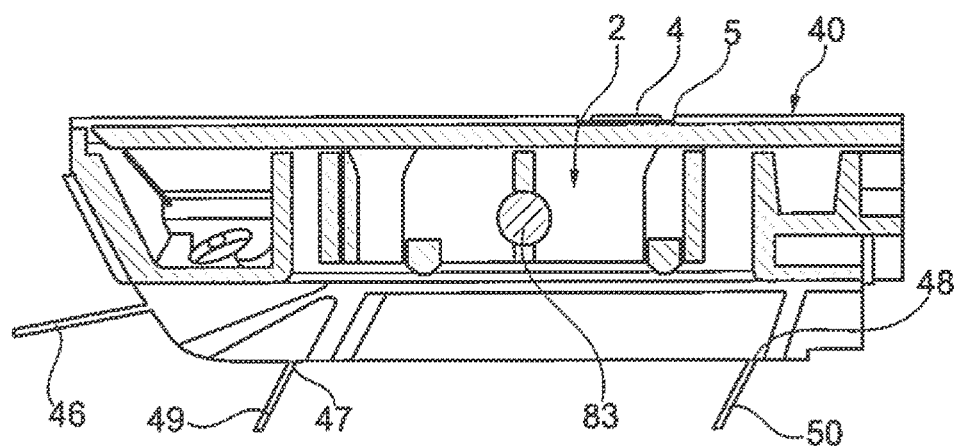
Figure 5:
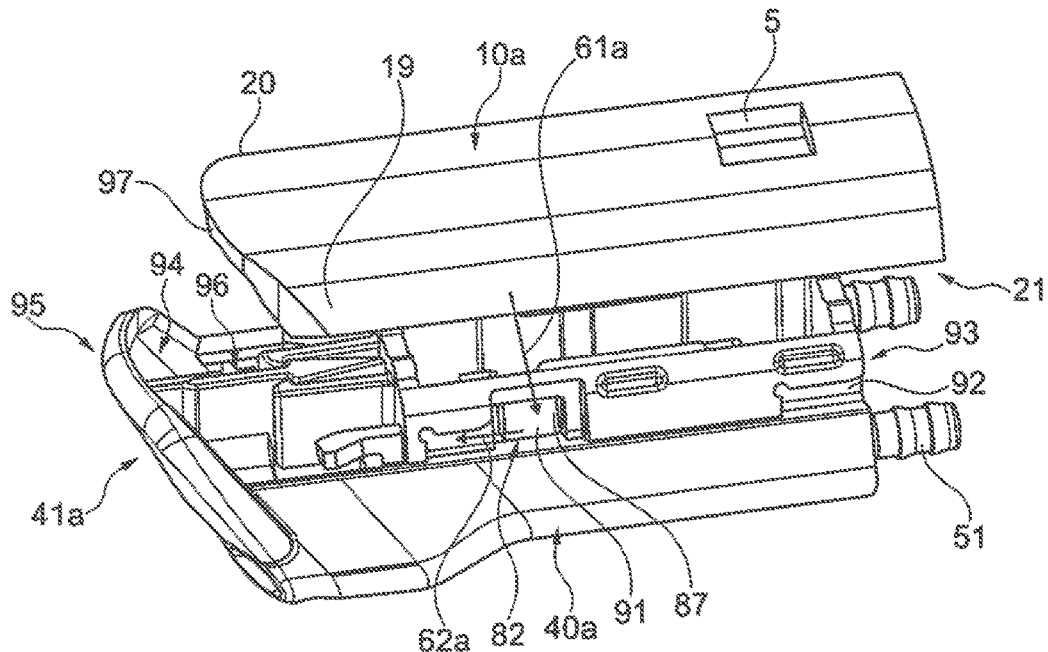
Figure 6:
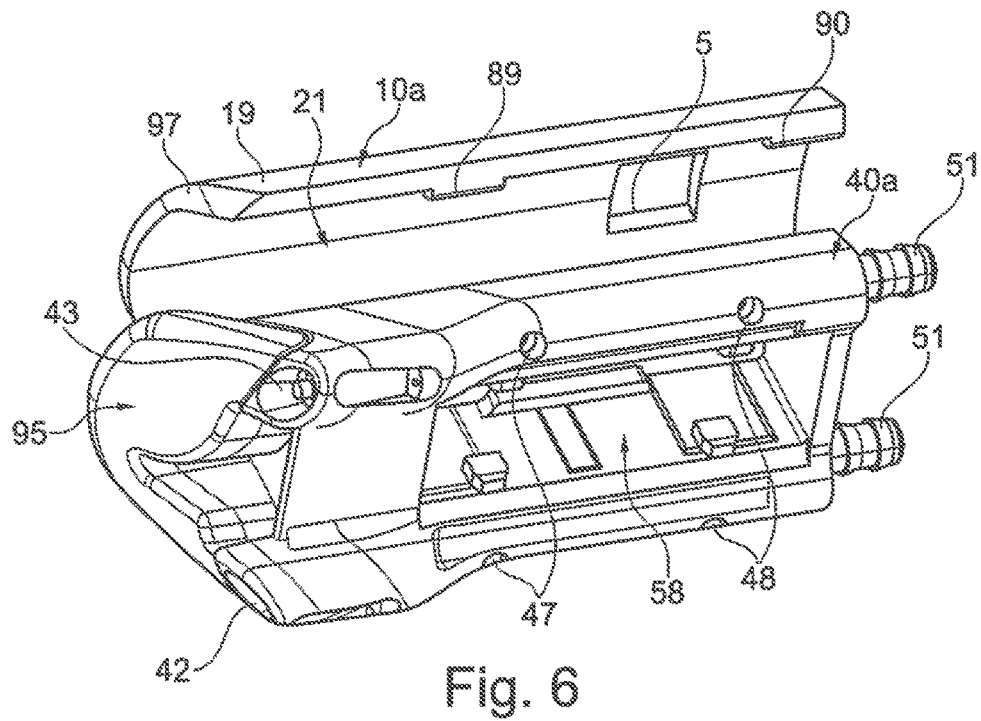
Figure 7:
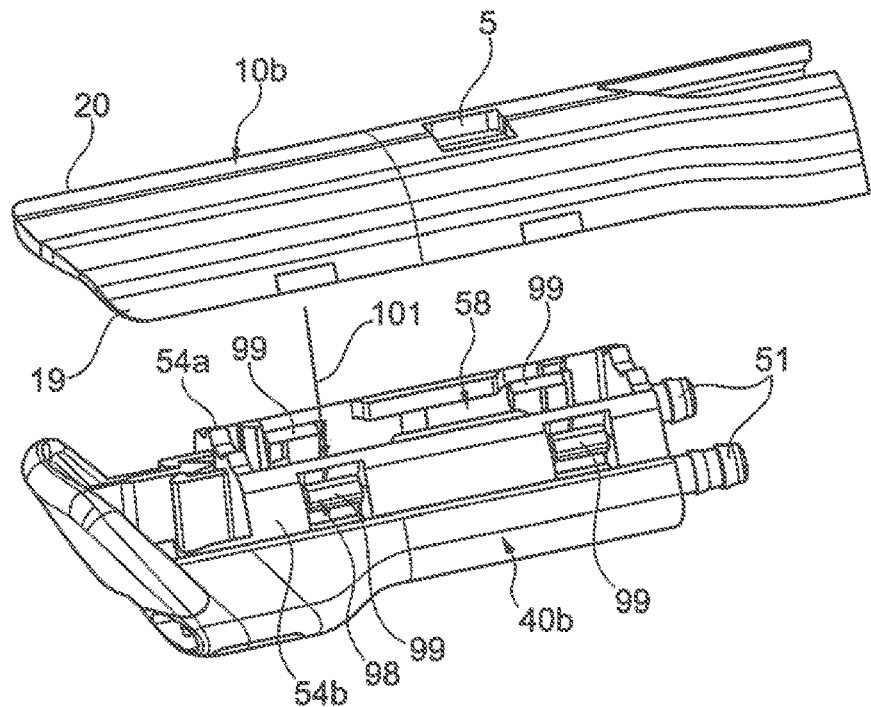
Figure 8:
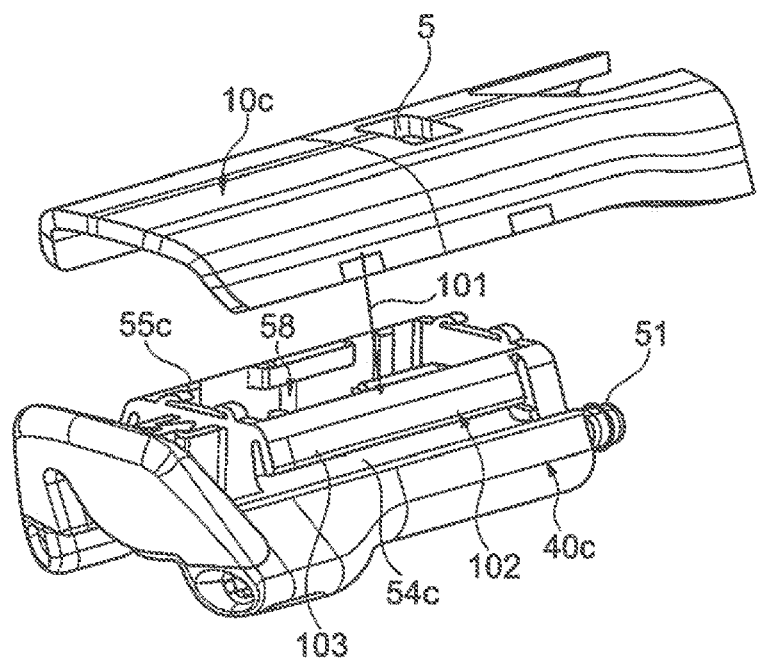
Figure 9:
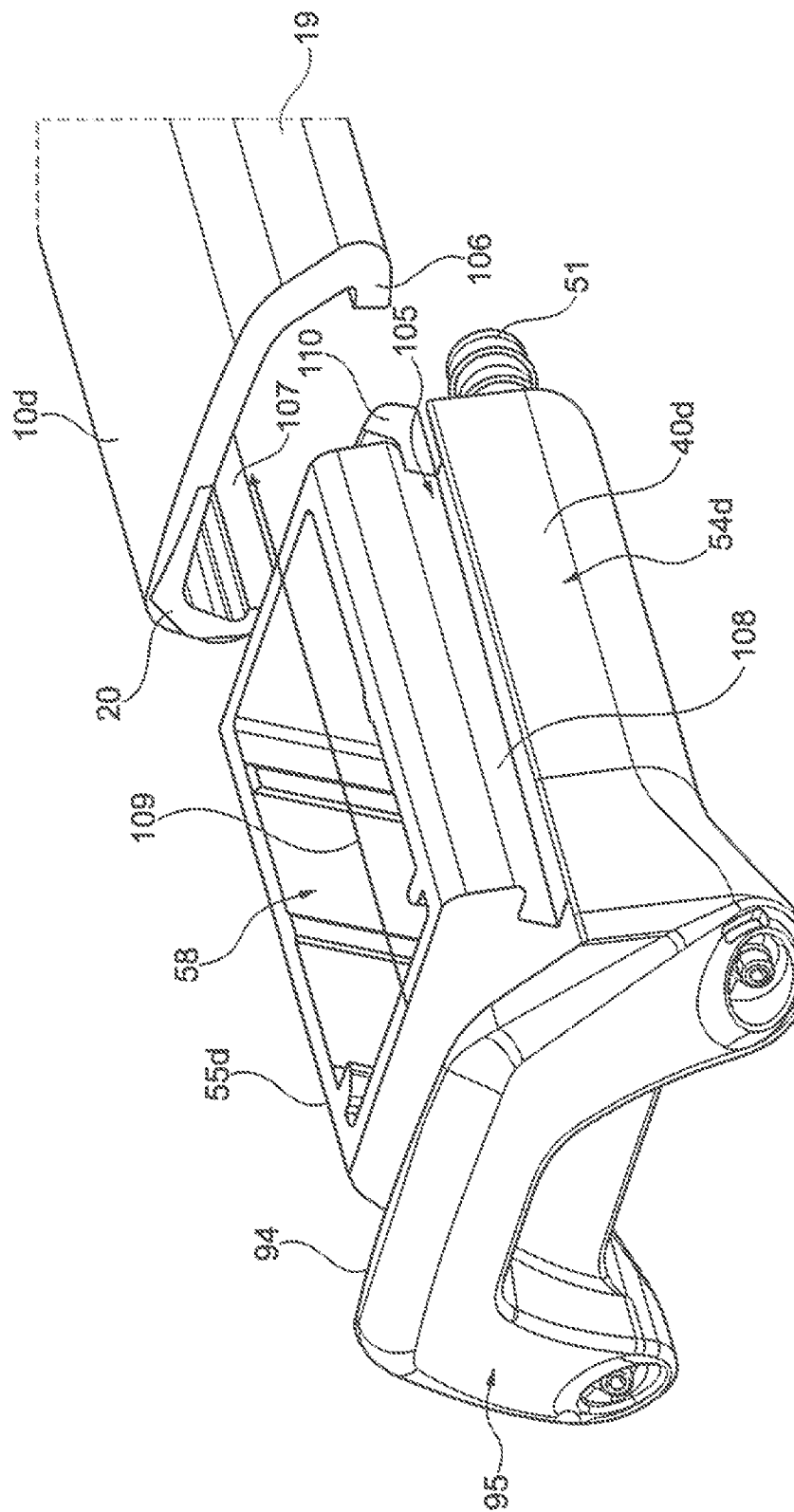
Figure 10:
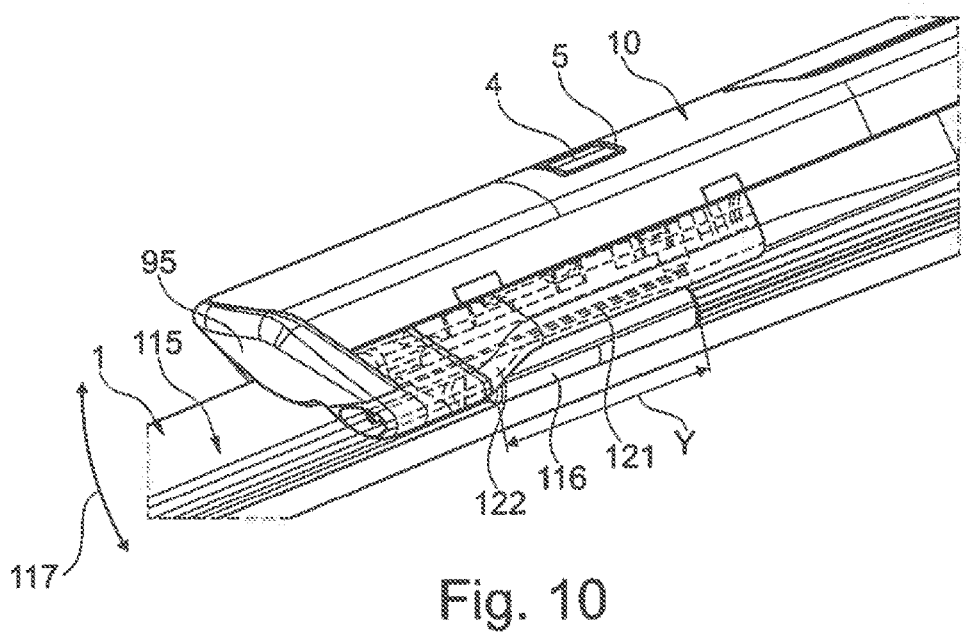
Figure 11:
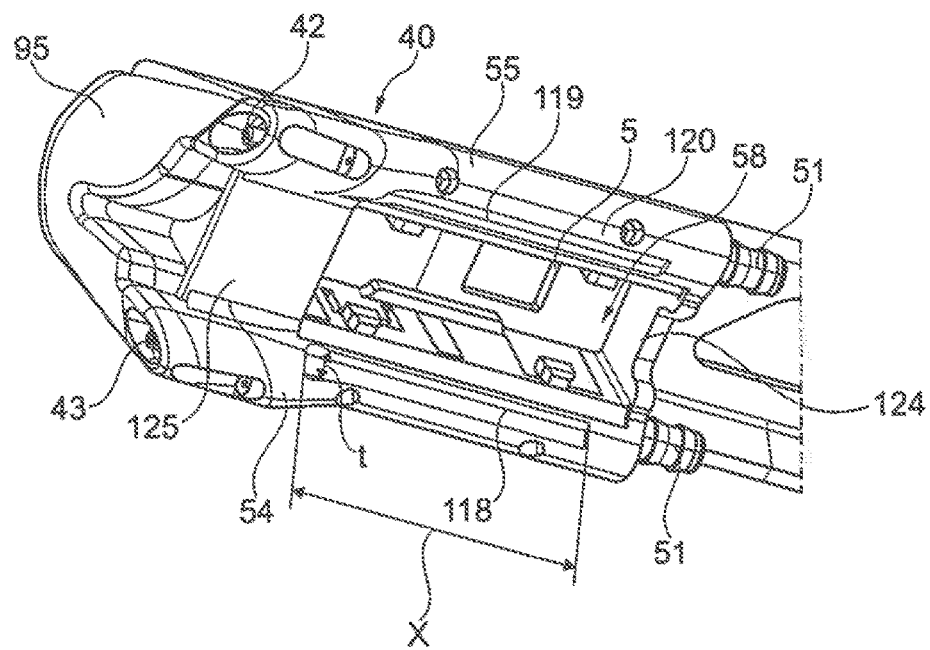
Figure 12:
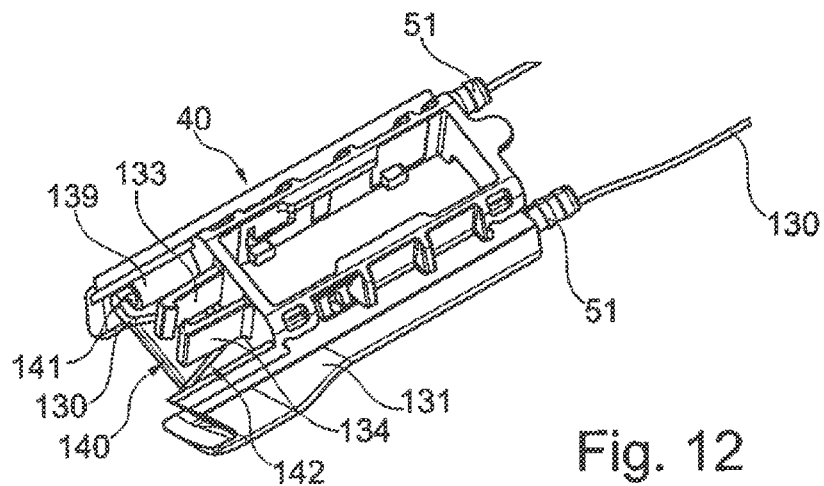
Figure 13:
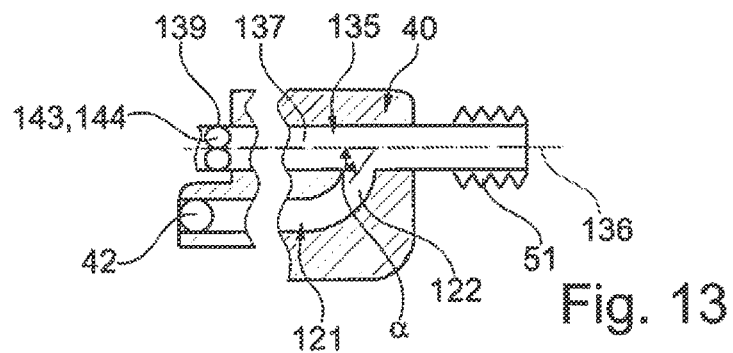
Figure 14:
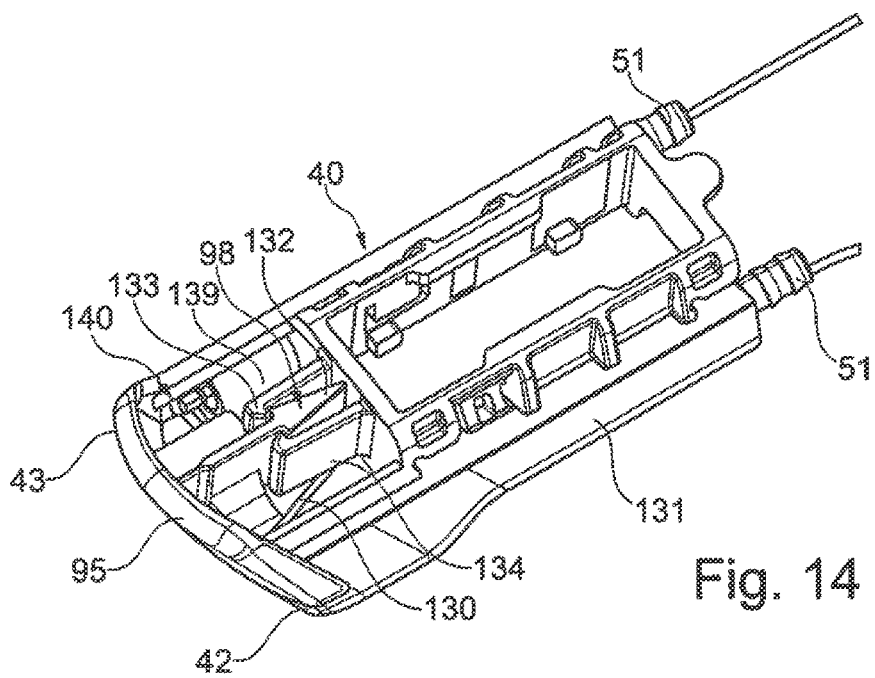
Figure 15:
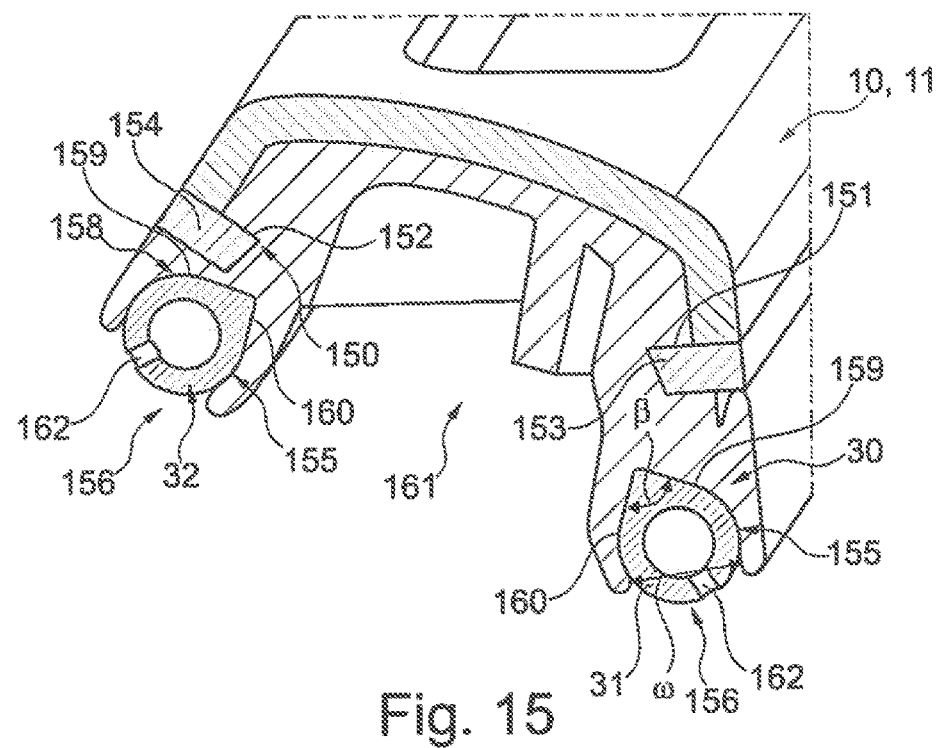
Figure 18:
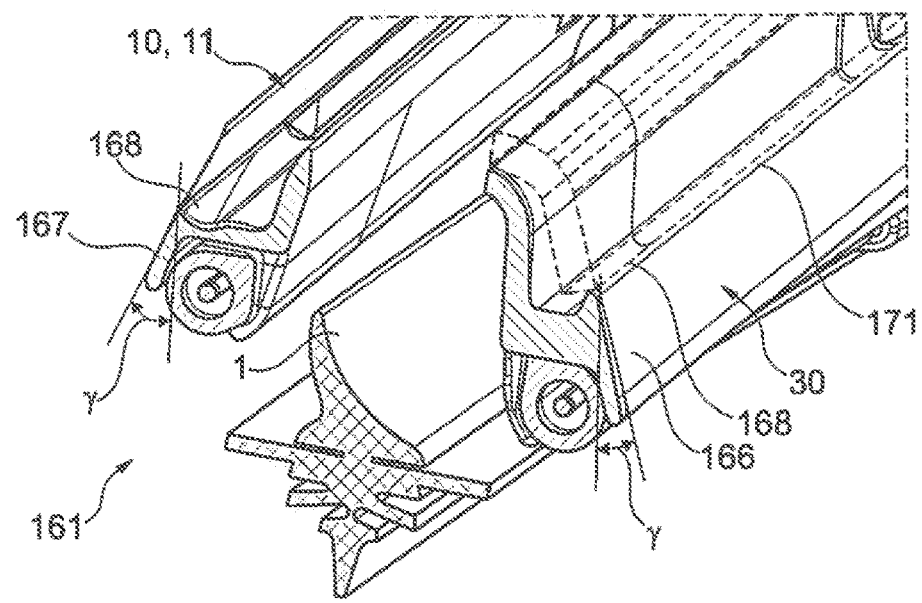
Figure 16:
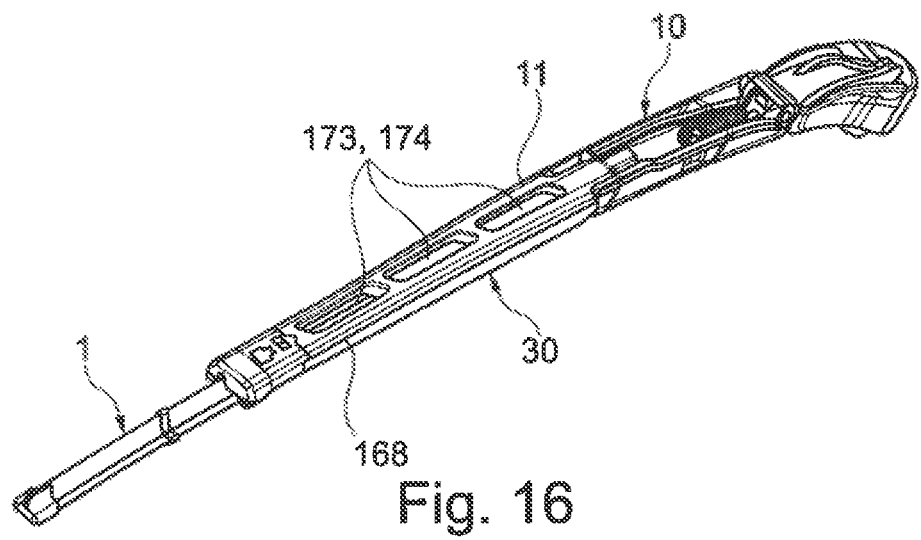
Figure 17:
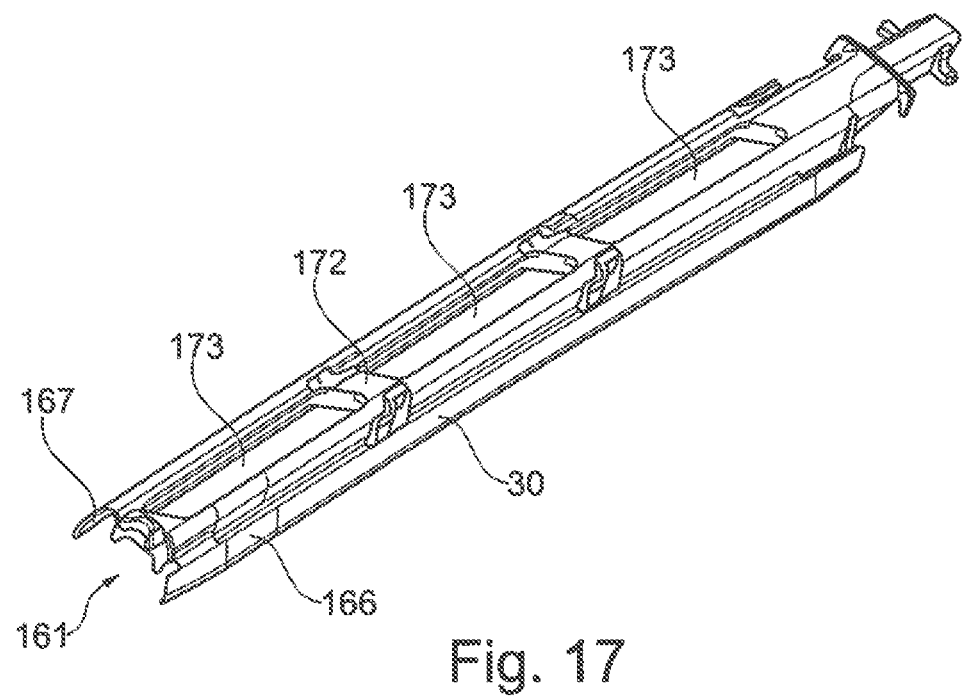
Figure 19:
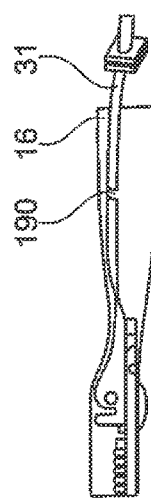
Figure 21:
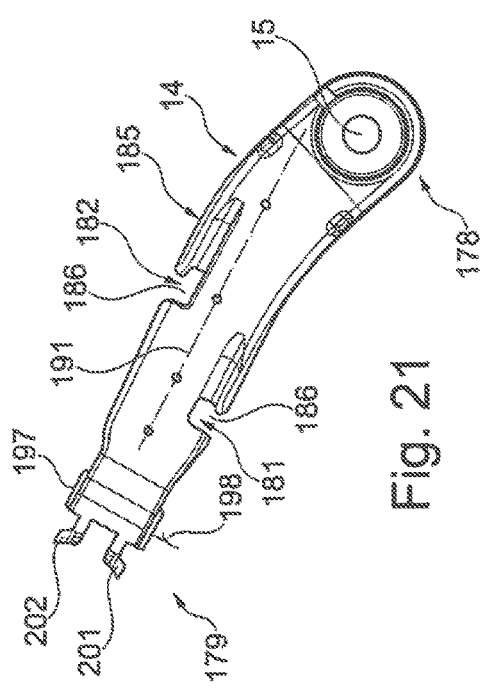
Figure 22:
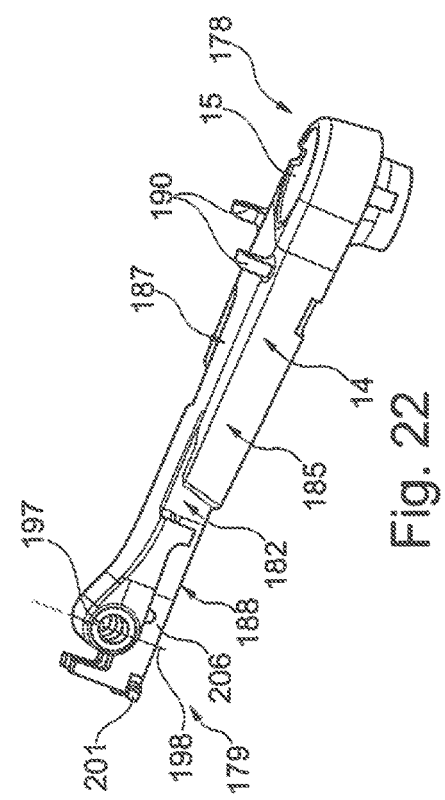
Figure 20:
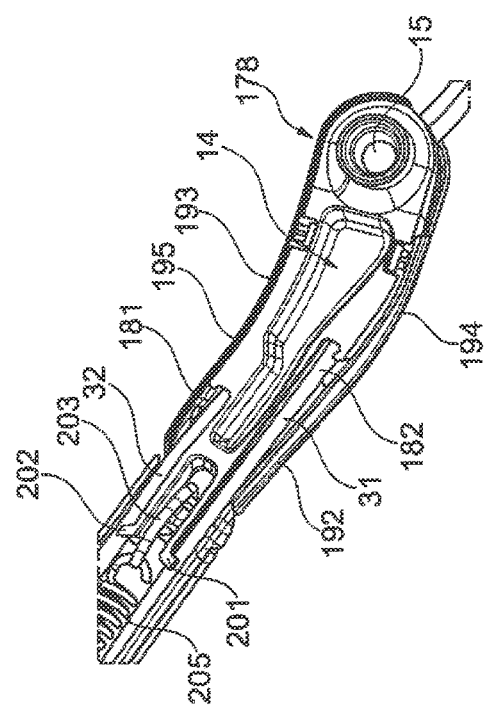
Figure 23:
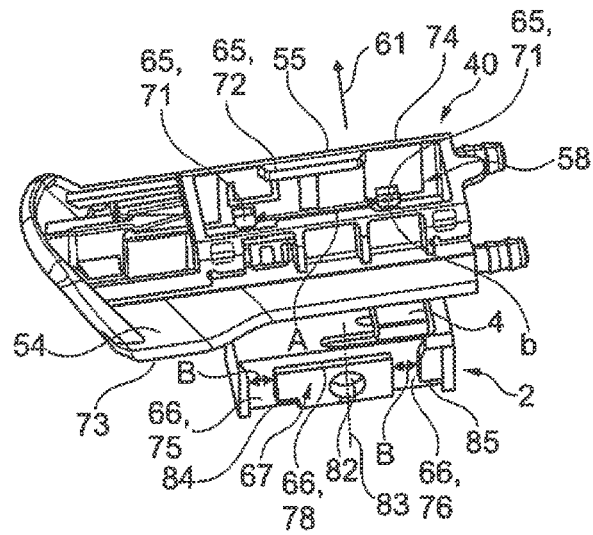
Figure 24:
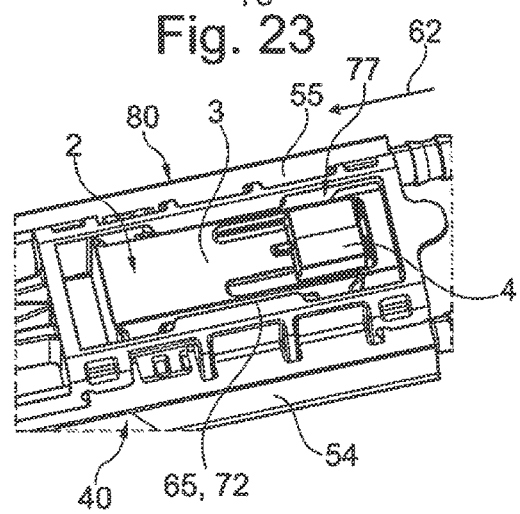
Figure 25:
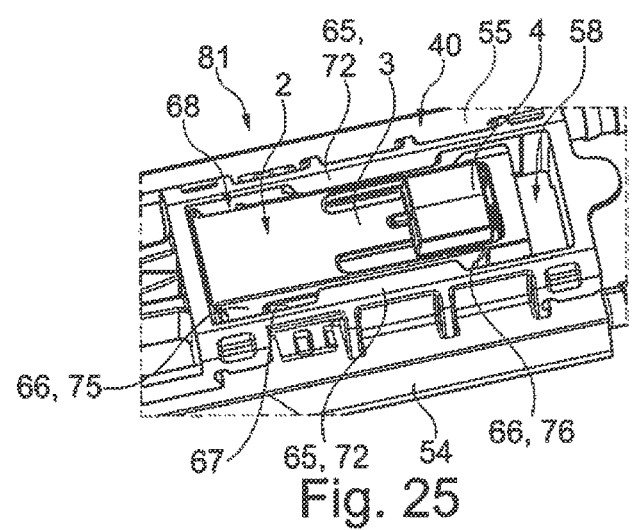

FIG. 3 shows the region between a fastening arrangement for the wiper blade and a cleaning arrangement of the wiper device in a plan view, FIG. 4 shows a view in the direction of the arrows IV-IV of FIG. 3, FIG. 5 and FIG. 6 each show, in different perspective views, the cleaning arrangement and a subregion of the wiper arm in the case of a connection between the cleaning arrangement and the wiper arm by way of a bayonet connection, FIG. 7 and FIG. 8 each show a subregion of the wiper arm and a cleaning arrangement, wherein the cleaning arrangement is connected to the wiper arm by way of an engagement connection, in each case in a perspective view, FIG. 9 shows a perspective view of a cleaning arrangement and of a subregion of a wiper arm, in the case of which the cleaning arrangement is slid into the wiper arm, FIG. 10 shows the fastening region of the wiper blade to the wiper arm in a perspective illustration, FIG. 11 shows a view from below of the cleaning arrangement of FIG. 10 in a perspective illustration, FIG. 12 shows the cleaning arrangement in a further perspective illustration, wherein the cleaning arrangement can be closed by way of a separate closure cap, FIG. 13 is an illustration, in longitudinal section, of ducts which are arranged in the cleaning arrangement as per FIG. 12 for the purposes of guiding a heating wire, FIG. 14 shows the cleaning arrangement as per FIG. 12 with closure cap mounted thereon in a perspective view, FIG. 15 shows a cross section through the wiper arm in the region of two liquid hoses with spray openings formed therein, FIG. 16 shows the wiper device as per FIG. 1 in a further, partially sectional or cutaway perspective illustration, FIG. 17 shows, in a perspective detail illustration, an auxiliary element in the form of a spray body arranged within the wiper arm, FIG. 18 shows a cross section through the region of the wiper arm as per FIG. 16, FIG. 19 is an illustration of the wiper arm head of the wiper arm, FIG. 20 shows a view from below of the wiper arm head as per FIG. 19 in a perspective illustration, FIG. 21 and FIG. 22 show the wiper arm head in each case in a perspective illustration from different perspectives, and FIG. 23 to FIG. 25 show a part of the fastening arrangement of the wiper blade and the cleaning arrangement in a perspective illustration during various mounting steps.

Identical elements or elements of identical function are denoted in the figures by the same reference designations.

FIG. 1 illustrates, in a perspective illustration, a wiper device 100 for cleaning a vehicle window (not shown), in particular a front window of the vehicle. The wiper device 100 has a wiper blade 1 which is in particular in the form of a so-called flat wiper blade. The wiper blade 1 is fastened exchangeably to a wiper arm 10. The wiper arm 10 comprises an elongate wiper arm rod 11 which is composed of metal or plastic and which acts as a carrier element and which is fastened pivotably, by way of a pin 12 and a sleeve 13 (FIG. 2), to a wiper arm head 14, which is composed in particular of aluminium (alternatively plastic). The wiper arm head 14 has, on the side averted from the wiper arm carrier 11, a through-opening 15 for the purposes of fastening the wiper arm head 14 rotationally conjointly to a wiper shaft (not shown) which is connected at least indirectly to a wiper bearing or to a wiper motor. The wiper arm head 14 is mounted so as to be pivotable about a wiper arm axis 17 and is, at least in the region of the through-opening 15, covered by a closure cap 16.

The wiper arm rod 11 has, over its entire length, a substantially U-shaped cross section with a top side 18 and with two side walls 19, 20 which project approximately at right angles from the top side 18 in the direction of the vehicle window. As viewed in the longitudinal direction of the wiper arm rod 11, said wiper arm rod forms, on the side averted from the wiper arm head 14, a mount or a first mount region 21 for the fastening of the wiper blade 1, this being adjoined in the direction of the wiper arm head 14 by a second mount region 22. An elongated moulded part which is composed of plastic and which is in the form of a spray body 30 is arranged within the second mount region 22. As can be seen from FIG. 1, the spray body 30 laterally terminates approximately flush with the two side walls 19, 20 of the wiper arm carrier 11. Furthermore, the spray body 30 projects, below the two side walls 19, 20, out of the second mount region 22 of the wiper arm rod 11.

Furthermore, within the second mount region 22, in particular within the cross section of the spray body 30, there are arranged two cleaning hoses 31, 32 (FIG. 2) which serve for the supply of cleaning liquid. The two cleaning hoses 31, 32 are arranged within the spray body 30 on opposite longitudinal sides of the wiper blade 1.

Within the first mount region 21 of the wiper arm rod 11, there is received a cleaning arrangement 40 which is in the form of a separate component composed of plastic. In particular, the cleaning arrangement 40 is arranged on that end region of the wiper arm rod 11 or of the wiper arm 10 which is averted from the wiper arm head 14. The fastening of the cleaning arrangement 40 within the first mount region 21 of the wiper arm rod 11 may be realized in a variety of ways, as will be discussed in more detail below.

The cleaning arrangement 40 has, on the side averted from the wiper arm head 14, a front end face 41 which simultaneously forms an end face of the wiper arm 10. By way of example, in the region of the front end face 41, there are arranged two first spray nozzles 42, 43, whose spray jets 45, 46, which can be seen in FIGS. 3 and 4, are oriented so as to be inclined at an angle with respect to the longitudinal direction of the wiper arm carrier 11 in the direction of the vehicle window. It is furthermore essential that the two first spray nozzles 42, 43 are arranged such that the spray jets 45, 46 can apply the cleaning liquid to the vehicle window in front of different longitudinal sides of the wiper blade 1. Furthermore, by way of example, the cleaning arrangement 40 has, in the region of its opposite longitudinal sides, in each case two second spray nozzles 47, 48 for the cleaning liquid, which spray nozzles generate spray jets 49, 50 which are likewise oriented at an angle with respect to the longitudinal axis of the wiper arm rod 11 in the direction of the vehicle window, wherein the orientation is furthermore in the direction of the side averted from the wiper arm head 14.

For the supply of the cleaning liquid to the cleaning arrangement 40 via the cleaning hoses 31, 32, the cleaning arrangement 40 has, on the side facing toward the wiper arm head 14 and in the region of its two longitudinal sides, in each case one feed connector 51, onto which the respective cleaning hose 31, 32 is pushed. Furthermore, the two cleaning hoses 31, 32 have, as can be seen in particular when viewing FIG. 1 and FIG. 15 together, spray nozzles 162 for generating additional spray jets 52 which are likewise directed toward the vehicle window and which strike the vehicle window on both sides of the wiper blade 1. A cleaning arrangement 40 as described up to this point makes it possible, together with the two cleaning hoses 31, 32, and by way of a supply of cleaning liquid which is controlled in a manner dependent on the wiping direction 53 of the wiper blade 1, for cleaning liquid to be applied to the vehicle window in each case in front of the longitudinal side of the wiper blade 1 in the movement direction of the wiper blade 1.

The cleaning arrangement 40 has two side walls 54, 55 (FIG. 3) which, at least in certain regions, run flush with the inner sides of the side walls 19, 20 of the wiper arm rod 11 in the region of the first mount region 21.

Furthermore, the cleaning arrangement 40 has a through-opening 57. The cleaning arrangement 40 forms an additional mount region 58 which is of approximately U-shaped form in cross section and which has an aperture in the region of the through-opening 57. In particular, the cleaning arrangement 40 which is received within the wiper arm 10 or the first mount region 21 serves for the fastening of the wiper blade 1. For this purpose, the wiper blade 1 has a wiper blade adapter, only certain areas of which are illustrated in the figures, and which has a fastening arrangement 2.

The fastening arrangement 2 has, on the side facing toward the top side 18 of the first mount region 21, a spring tongue 3 with an engagement button 4 which, in the mounted state of the wiper blade 1 or of the fastening arrangement 2 on the wiper arm 10, engages in positively locking fashion into an opening 5 formed in the top side 18 of the wiper arm 10. In particular, the engagement button 4 forms, together with the opening 5, an engagement connection between the wiper blade 1 and the wiper arm 10, by way of which engagement connection the wiper blade 1 or the fastening arrangement 2 is secured on the wiper arm 10, wherein, after the engagement connection has been released, the wiper blade 1 can be dismounted from the wiper arm 10, in particular in order to permit an exchange of the wiper blade 1.

As can be seen in particular from the illustration of FIGS. 1 and 4, both the fastening arrangement 2 and the cleaning arrangement 40 are arranged, at least in certain areas, within the first mount region 21 of the wiper arm 10 or of the wiper arm rod 11. Furthermore, in the mounted state of the fastening arrangement 2, the additional mount region 58 of the cleaning arrangement 40 encompasses the fastening arrangement 2, whereas the first mount region 21 of the wiper arm 10 encompasses the cleaning arrangement 40.

Figure 2:
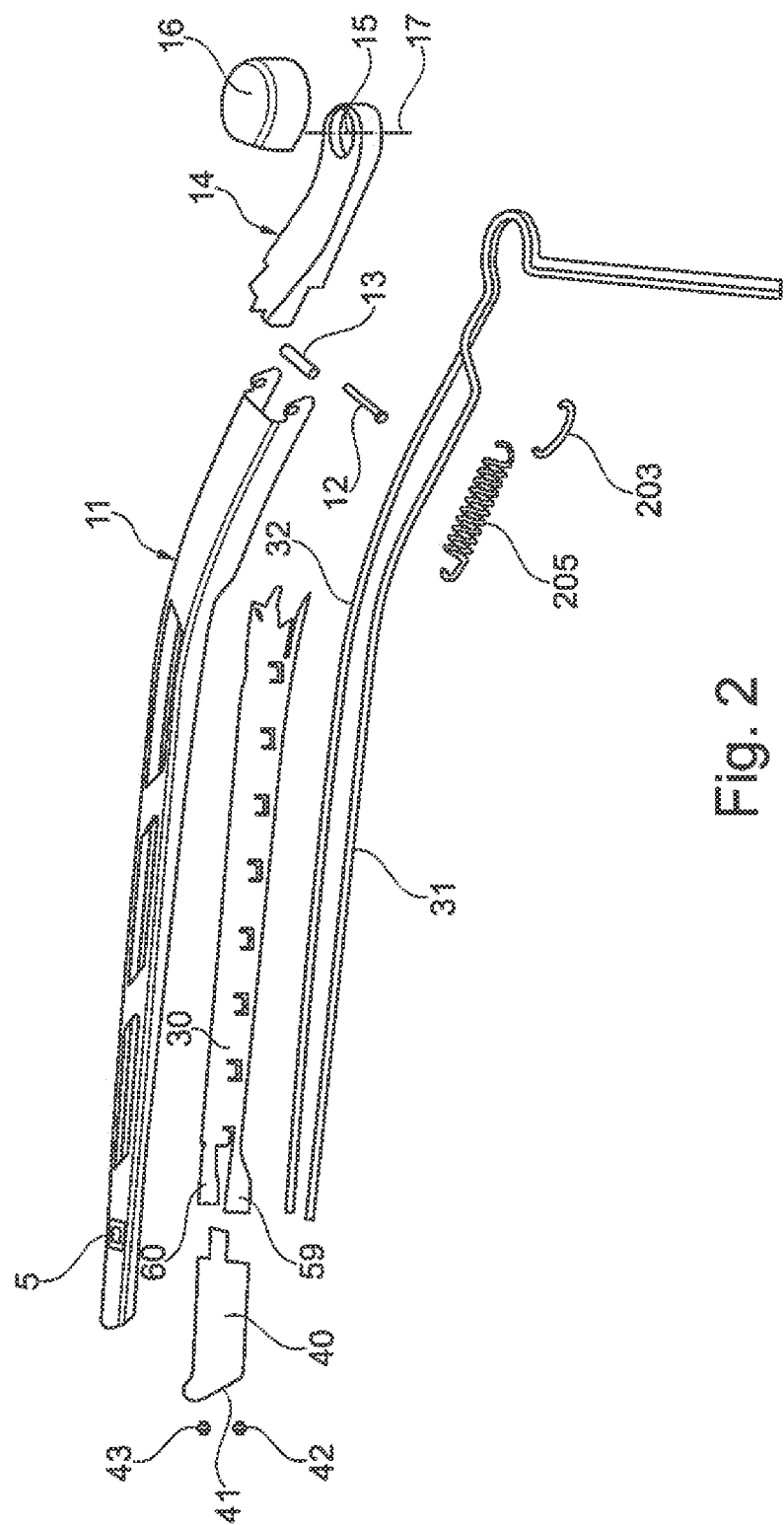
FIG. 2 shows the constituent parts of the cleaning arrangement as per FIG. 1 in a perspective exploded illustration.

Corresponding to the illustration of FIGS. 1 and 2, provision may also be made whereby the cleaning arrangement 40 is, on the side facing toward the spray body 30, laterally covered in certain areas by the spray body 30, for example by way of two lugs 59, 60 arranged on the spray body 30 on the longitudinal sides thereof.

On the basis of FIGS. 23 to 25, the connection between the fastening arrangement 2 of the wiper blade 1 and the cleaning arrangement 40 will now be discussed in more detail: here, FIG. 23 shows the fastening arrangement 2 before the mounting thereof on the cleaning arrangement 40. For the mounting of the fastening arrangement 2 on the cleaning arrangement 40, the fastening arrangement 2 is moved relative to the cleaning arrangement 40 in the direction of a first mounting direction 61, which runs perpendicular to the longitudinal direction of the wiper arm 10. FIGS. 24 and 25 illustrate the state in which the fastening arrangement 2 is arranged within the additional mount region 58 of the cleaning arrangement 40 and, there, can be moved no further in the direction of the first mounting direction 61. Subsequently, a relative movement of the fastening arrangement 2 with respect to the cleaning arrangement 40 is performed in the direction of a second mounting direction 62 (FIG. 24), wherein the second mounting direction 62 runs perpendicular to the first mounting direction 61. In the final state illustrated in FIG. 25, the fastening arrangement 2 is (fully) mounted on the cleaning arrangement 40, wherein, at the same time, the engagement button 4 of the fastening arrangement 2 is engaged with the opening 5 on the top side 18 of the wiper arm 10 (not shown).

To form a guide between the fastening arrangement 2 and the cleaning arrangement 40 during the mounting along the two mounting directions 61, 62, the fastening arrangement 2 and the cleaning arrangement 40 have first and second guide means 65, 66 which cooperate with one another. The first guide means 65 are for example formed, in the form of first elevations 71 and second elevations 72, in the region of the cleaning arrangement 40, on the inner side of the two side walls 54, 55, which are arranged parallel to one another, of the cleaning arrangement 40. The first elevations 71 are formed in the form of cams which, in the region of a lower edge 73 of the cleaning arrangement 40, are arranged with a spacing A to one another. By contrast, the second elevation 72 is arranged in the region of a top edge 74 of the cleaning arrangement 40 and has an elongated shape. In particular, the second elevation 72, which is arranged between the two first elevations 71 as viewed in the longitudinal direction of the cleaning arrangement 40, simultaneously serves as an axial abutment for the fastening arrangement 2 when the latter is inserted into the cleaning arrangement 40 in the direction of the first mounting direction 61.

The first elevations 71 on the cleaning arrangement 40 cooperate with in each case one depression 75, 76 as second guide means 66, which are formed on in each case an outer side of a side wall 67, 68 of the fastening arrangement 2. In particular, the two depressions 75, 76 have in each case a width B slightly larger than a width b of the two first elevations 71, such that, in the position of the fastening arrangement 2 illustrated in FIG. 24, there is movement play 77 in the cleaning arrangement 40 in the direction of the second mounting direction 62. The depressions 75, 76 transition, in the direction of the top side, which faces toward the spring tongue 3, of the fastening arrangement 2, into an elongated depression 78.

Viewed overall, the first and second guide means 65, 66 serve, during the mounting process, to guide the fastening arrangement 2 between the starting position 80 illustrated in FIG. 24 and the end position 81 illustrated in FIG. 25. Furthermore, by way of corresponding geometric dimensioning of the guide means 65, 66, it is ensured that the movement play 77 that is initially provided in the starting position 80 is reduced to zero in the end position 81, that is to say the fastening arrangement 2 is, in the end position 81, received without play within the cleaning arrangement 40. By way of the discussed geometric dimensioning, it is the case here that the movement play 77 decreases preferably in continuous fashion between the starting position 80 and the end position 81.

It can be seen in FIG. 23 that the fastening arrangement 2, which is part of the wiper blade adapter (not illustrated) for the fastening of the wiper blade 1 to the wiper arm 10, has an opening 82 which forms an axis of rotation 83, with the wiper blade 1 being mounted in the fastening arrangement 2 so as to be pivotable about said axis of rotation. Furthermore, it can be seen that the first elevations 71 are, in relation to the additional mount region 58 in the cleaning arrangement 40 or in relation to the depressions 75, 76 of the fastening arrangement 2, arranged at corner regions of the fastening arrangement 2 and of the cleaning arrangement 40, wherein the axis of rotation 83 is arranged between the first elevations 71. Finally, it can be seen from FIG. 23 and FIG. 25 that, by way of the depressions 75, 76 or the delimiting surfaces 84, 85 thereof, in the end position 81, the delimiting surfaces 84, 85 act as an abutment in order to limit the relative movement between the cleaning arrangement 40 and the fastening arrangement 2.

Different fastening types between the cleaning arrangement 40 and the first mount region 21 on the wiper arm 10 or on the wiper arm rod 11 will now be discussed with reference to FIGS. 5 to 9. All of the fastening types have in common the fact that the cleaning arrangement 40 is in each case directly connected to the wiper arm 10. FIGS. 5 and 6 will be discussed first, from which figures it can be seen that the connection between the cleaning arrangement 40a and the wiper arm 10a is realized by way of a bayonet connection 88. For this purpose, as can be seen most clearly from FIG. 6, the wiper arm 10a has, on the inner side of the two side walls 19, 20, two projections 89, 90 which are spaced apart from one another as viewed in the longitudinal direction. The projections 89, 90 cooperate with cutouts 91, 92 formed on the cleaning arrangement 40a. Whereas the cutouts 91 formed in the region of the side walls 54a, 55a of the cleaning arrangement 40a are situated in an approximately central region in relation to the longitudinal extent of the cleaning arrangement 40a, the cutouts 92 are arranged on the side averted from the front face end face 41a, and terminate with an end face 93. Furthermore, the cutouts 91 are of L-shaped form, whereas the cutouts 92 are in the form of elongated cutouts. A bayonet connection 88 of said type enables the cleaning arrangement 40a to be mounted on the wiper arm 10a by virtue, for example, of the wiper arm 10a firstly being connected to the cleaning arrangement 40a in the direction of the first mounting direction 61a, wherein the projections 89 engage into the vertical part of the cutouts 91. When the projections 89 bear against the underside of the cutouts 91, a movement of the wiper arm 10a takes place in the direction of the second mounting direction 62a, wherein the projections 89, 90 cooperate with the cutouts 91, 92 which are each oriented or arranged in the longitudinal direction of the cleaning arrangement 40a. The relative movement between the wiper arm 10a and the cleaning arrangement 40a is limited by virtue of the projections 89, 90 bearing in each case against those delimitations of the cutouts 91, 92 which face toward the end face 41a. Here, the rear side 94 of a closure cap 95 which is connected by way of an engagement connection 96 to the cleaning arrangement 40a is still arranged with a minimal spacing to the front end face 97 of the wiper arm 10a. To prevent an inadvertent detachment of the cleaning arrangement 40a from the wiper arm 10a, an engagement cam 87 is arranged with resilient action in the vertical section of the cutout 91. The engagement cam 87 projects into the movement travel of the projection 89 and is pushed inward by said projection during the insertion into the cutout 91. When the projection 89 is situated in the horizontally arranged section of the cutout 91, the engagement cam 87 springs back into its original position and forms an abutment for the projection 89 in the event of a movement of the cleaning arrangement 40a counter to the direction of the mounting direction 62a.

FIG. 7 illustrates the situation in which the wiper arm 10b is connected to the cleaning arrangement 40b by way of an engagement connection 98. For this purpose, the two side walls 54b, 55b of the cleaning arrangement 40b have, in their upper region, in each case two engagement cams 99 which are spaced apart from one another axially in relation to the longitudinal direction of the cleaning arrangement 40b and which, from the position illustrated in FIG. 7, are elastically deformable for example into a position offset in the direction of the side walls 54b, 55b. In the region of the wiper arm 10b, the latter has, on the inner side of the two side walls 19, 20, projections which are arranged, in FIG. 5, in overlap with the engagement cams 99 (analogously to the projections 89, 90 in the case of the wiper arm 10a) and which, during the relative movement of the wiper arm 10b in the direction of the mounting direction 101 toward the cleaning arrangement 40b, cause the engagement cams 99 to be pushed in and to subsequently be locked to the wiper arm 10b. Here, it is essential that, by way of a corresponding design of the engagement cams 99, easy release of the cleaning arrangement 40b from the wiper arm 10b is made possible.

The engagement connection 102 illustrated in FIG. 8 differs from the engagement connection 98 in that, on the cleaning arrangement 40c, in the region of the two side walls 54c, 55c, there are respectively arranged elongated barbs 103 which, in forming the engagement connection 102, cooperate with the projections arranged in the region of the wiper arm 10c in such a way that the engagement connection 102 can no longer be released again.

FIG. 9 illustrates the situation in which the cleaning arrangement 40d is connected to the wiper arm 10d by way of a positively locking connection 105. The positively locking connection 105 has, on the wiper arm 10d, elongated projections or guide elements 106, 107 which project inward from the side walls 19, 20 of said wiper arm and which cooperate with counterpart elements in the form of groove-like, elongated cutouts 108 in the region of the two side walls 54d, 55d of the cleaning arrangement 40d. It is thereby possible for the cleaning arrangement 40d to be inserted by way of a linear movement into the (open) cross section of the first mount region 21 of the wiper arm 10d in the direction of the mounting direction 109, wherein the guide elements 106, 107 pass into the cutouts 108 and, in so doing, fix the cleaning arrangement 40d in a direction running perpendicular to the mounting direction 109. The axial movement or the sliding-in movement of the cleaning arrangement 40d is likewise limited by the rear side 94 of the closure cap 95. Furthermore, in order to prevent the cleaning arrangement 40d from inadvertently being pulled out of the wiper arm 10d, provision may be made for an engagement connection to be formed between the cleaning arrangement 40d and, for example, the spray body 30, for which purpose, for example, the cleaning arrangement 40d has engagement hooks 110.

In FIGS. 10 and 11, a further detail of the pivotable fastening of the wiper blade 1 to the wiper arm 10 will now be discussed. In particular, it can be seen on the basis of FIG. 10 that the wiper blade 1, in particular the wiper blade body 115 thereof, is connected by way of a wiper blade adapter to the wiper arm 10 or to the cleaning arrangement 40, which, aside from the fastening arrangement 2, has an adapter element 116 which is fastened to the wiper blade body 115 and which is pivotably connected to the fastening arrangement 2 in the region of the through-opening 57 of the fastening arrangement 2. The adapter element 116 has a length Y as viewed in the longitudinal direction of the wiper blade 1.

To make it possible for the wiper blade 1 to be pivoted through as great as possible a pivot angle in the direction of the double arrow 117 (FIG. 10) relative to the wiper arm 10, the wiper arm 10, in particular the cleaning arrangement 40, has two elongated cutouts 118, 119 which can be seen in FIG. 11. The two cutouts 118, 119 each have a length X slightly greater than the length Y of the adapter element 116. In particular, in the mounted state of the wiper blade 1 on the cleaning arrangement 40, the adapter element 116 projects into the two cutouts 118, 119. As viewed over their length, the two cutouts 118, 119 each have an at least substantially constant cross section. They proceed from the underside 120 of the cleaning arrangement 40 and project into the side walls 54, 55 of the cleaning arrangement 40 at the inner side thereof. In particular, provision may be made whereby, correspondingly to the illustration of FIG. 11, the depth t of the respective cutout 118, 119 increases slightly on the side facing toward the first spray nozzles 42, 43 in order to increase the possible pivot angle of the adapter element 116.

Viewing FIGS. 10 and 11 together, it can furthermore be seen that the two feed connectors 51 of the cleaning arrangement 40 are situated approximately at the level of the cutout 118, 119, in the same way as the two first spray nozzles 42, 43. FIG. 10 shows a connecting duct 121 which connects a feed connector 51 to a first spray nozzle 42 or 43. The connecting duct 121 runs, in the region of the cutout 118, 119, at least approximately parallel to the cutout 118, 119 and is hydraulically connected to the respective first spray nozzle 42, 43 and to the respective feed connector 51 by way of a section 122 of curved form.

From FIG. 11, it can also be seen that the two side walls 54, 55 of the cleaning arrangement 40 are, on both sides of the cutouts 118, 119, connected to one another by way of two transverse connecting elements 124, 125 which permit stiffening of the cleaning arrangement 40, wherein the two transverse connecting elements 124, 125 are arranged outside the further mount region 58 for the fastening arrangement 2 or the adapter element 116.

Below, the arrangement of a heating element in the form of a heating wire 130, which extends within the cleaning arrangement 40, will be discussed with reference to FIGS. 12 to 14. For this purpose, the cleaning arrangement 40 has a main body 131 which is connected by way of the closure cap 95, as already described above, by way of the engagement connection 98. The engagement connection 98 has, on the closure cap 95, an engagement hook 132 which, in the locking position, cooperates with two counterpart engagement elements 133, 134 arranged on both sides of the engagement hook 132. In particular, the closure cap 95 serves, in the installed state of the cleaning arrangement 40 on the wiper arm 10, to close off, in a surface-flush manner, the first mount region 21, which is open at the end side, of the wiper arm 10.

From FIG. 13, it can be seen that the two feed connectors 51 are connected to the respective first spray nozzle 42, 43 by way of the connecting duct 121. From the connecting duct 121, in the transition region to the section 122, there extends in each case one branch 135 with a section 137, wherein the section 137 forms a rectilinear elongation of a longitudinal axis 136 of the connecting duct 121. In this way, the section 122 runs at an angle α with respect to the longitudinal axis 136. On the side averted from the branch 135, the section 137 has a mouth region 139 which opens out within a connecting chamber 140 formed between the closure cap 95 and the main body 131. The section 137 or the mouth region 139 furthermore forms a feed port 141 in the connecting chamber 140.

Within the two connecting ducts 121, between the respective feed connector 51 and the branch 135 and within the two sections 137 and in the connecting chamber 140, the (single) heating wire 130 is led at least substantially horizontally. For this purpose, the heating wire 130 is, in the region of the connecting chamber 140, arranged in the form of a loop 142 below the two counterpart engagement elements 133, 134, in order to make it possible for the engagement hook 132 to interact, without making contact with the heating wire 130, with the two counterpart engagement elements 133, 134.

To hydraulically seal off the section 137 in order that no cleaning liquid can pass into the region of the connecting chamber 140, it is for example the case that a seal element 143 or a seal compound 144 is arranged within the respective mouth region 139. Furthermore, provision may be made whereby the connecting chamber 140 itself is also hydraulically sealed off to the outside by way of corresponding measures. It is also pointed out that the feed port 141 is of tubular form, or has a hollow cross section, in the region of the connecting chamber 140.

For the mounting of the healing wire 130 in the cleaning arrangement 40, the heating wire 130 is laid in the main body 131 corresponding to the illustration in FIG. 13. It is pointed out, merely in supplementary fashion, that the heating wire 130 is also arranged or led within the cleaning hoses 31, 32 in order to heat these as well as the cleaning arrangement 40. After the mounting of the heating wire 130 in the main body 131, it is the case, corresponding to the illustration of FIG. 14, that the closure cap 95 is connected by way of the engagement connection 96 to the main body 131 in order to close off the connecting chamber 140 or the main body 131.

A detail regarding the fastening or guidance of the two cleaning hoses 31, 32 in the region of the spray body 30, which is in the form of a moulded part, will be discussed in more detail below in FIG. 15. In particular, the spray body 30 is at least substantially formed over the entire length of the two cleaning hoses 31, 32 in the region of the wiper arm rod 11. The spray body 30 is connected to the wiper arm rod 11 by way of an engagement connection 150. For this purpose, the spray body 30, which has approximately a U-shaped cross section, has two grooves 151, 152 which run in a longitudinal direction and into which inwardly projecting sections 153, 154 of the cross section of the wiper arm rod 11 engage in positively locking fashion and fix the spray body 30 to the wiper arm rod 11 in a direction running perpendicular to its longitudinal extent.

On the underside averted from the wiper arm rod 11, the spray body 30 has in each case one mount 155 for receiving the respective cleaning hose 31, 32 in positively locking fashion, having in each case one insertion slot 156, the opening width w of which is slightly smaller than the cross section of the cleaning hose 31, 32 in the unloaded state of the cleaning hose 31, 32, such that the respective cleaning hose 31, 32 is held in the mount 155 by way of a clamping action.

The cleaning hose 31, 32, which is formed from a plastics material as an extruded part, has the same cross section over its entire length. In particular, the cross section of the cleaning hose 31, 32 within the mount 155 is characterized in that the cleaning hose 31, 32 has a non-circular region 158. The non-circular region 158 is formed by two planar outer wall sections 159, 160 which are arranged at an angle β with respect to one another. Such a design of the cleaning hose 31, 32 has the effect that said cleaning hose is not only held within the mount 155 by way of a clamping action but also assumes a position with a fixed angle of rotation. For the positively locking mounting of the cleaning hose 31, 32, the mount 155 thereof is furthermore of identical but inverse design with respect to the outer contour of the cleaning hose 31, 32, wherein the angle β between the two outer wall sections 159, 160 is at most 90°.

The cleaning hoses 31, 32 have, in particular, multiple spray nozzles 162 which are arranged so as to be spaced apart from one another in the longitudinal direction at uniform intervals and which are in the form of through-openings for forming the additional spray jets 52 (FIG. 1). The spray nozzles 162 are situated in the region of the insertion slot 156. Between the two mounts 155 for the two cleaning hoses 31, 32, the spray body 30 forms a mount region 161 for the wiper blade 1 (not illustrated in FIG. 15). In this way, by way of a corresponding supply of the cleaning liquid to the two cleaning hoses 31, 32, it is possible, in a manner dependent on the movement direction of the wiper blade 1 or of the wiper arm 10, for cleaning liquid to be applied to the vehicle window in each case in front of the wiper blade 1 by way of the spray nozzles 162. As already discussed above, the cleaning hoses 31, 32 are in turn connected to the cleaning arrangement 40, which has the first and second spray nozzles 42, 43 and 47, 48.

FIGS. 16 to 18 illustrate further details of the wiper arm 10 or of the wiper arm rod 11 which serves as carrier element, of the spray body 30 which is designed and/or acts as an auxiliary element, and of the wiper blade 1. In particular, it can be seen from FIG. 18 that the spray body 30 has two air-guiding sections 166, 167 which extend in the longitudinal direction of the wiper arm 10 or of the wiper arm rod 11 and which are arranged parallel to one another and which project beyond the underside 168 of the wiper arm rod 11 on the side facing toward the vehicle window. In particular, from FIG. 18, it can also be seen that the two air-guiding sections 166, 167 are designed to be of different heights, such that, on the front side of the wiper arm 10 or of the wiper arm rod 11 in relation to a direction of travel, the air-guiding section 166 projects further from the underside 168 of the wiper arm rod 11 or of the wiper arm 10 than the air-guiding section 167 on the rear side of the wiper arm 10. Furthermore, the two air-guiding sections 166, 167 are, at least at the regions which project from the underside 168 of the wiper arm carrier 11, arranged at an oblique angle γ in relation to a vertically arranged longitudinal plane of the wiper arm 10. In a transition region 171 to the wiper arm rod 11, the two-air-guiding sections 166, 167 terminate at the outer side of the wiper arm rod 11 so as to be flush with the surface of the wiper arm rod 11.

Corresponding to the illustration of FIG. 17, the spray body 30 has a substantially U-shaped cross section with a base section 172 which connects the two air-guiding sections 166, 167, wherein the base section 172 has multiple cutouts or through-openings 173 which run in the longitudinal direction of the spray body 30 and which are at least approximately rectangular. The through-openings 173 are aligned with openings 174 on the wiper arm carrier 11, as can be seen in particular from FIG. 16, wherein the openings 174 are of at least approximately the same size as the through-openings 173.

Finally, FIGS. 19 to 22 illustrate the guidance and fastening of the two cleaning hoses 31, 32 in the region of the wiper arm head 14 in more detail. In particular, it can be seen that the wiper arm head 14 has, in the region between the first end region 178, in which the through-opening 15 for the drive shaft is arranged, and the second end region 179, in which the wiper arm rod 11 is pivotably fastened, means for guiding the two cleaning hoses 31, 32. Said means comprise in particular in each case one leadthrough 181, 182 in the form of a longitudinal slot for each cleaning hose 31, 32. The longitudinal slot or the leadthrough 181, 182 has, as viewed toward the outer contour 185 of the wiper arm head 14, an opening 186 through which the respective cleaning hose 31, 32 can be inserted. While the cleaning hose 31, 32 is guided along the top side 187 of the wiper arm head 14 on the side facing toward the first end region 178, said cleaning hose is arranged above the underside 188 of the wiper arm head 14 on the side facing toward the second end region 179.

From FIGS. 19 and 22, it can also be seen that the means for guiding the two cleaning hoses 31, 32 furthermore additionally have guide projections 190. The guide projections 190 are integrally formed on the wiper arm head 14, which is composed of aluminium (alternatively plastic) and which is in the form of an injection-moulded part, and have the effect that the two cleaning hoses 31, 32 run laterally within the outer contour 185 of the wiper arm head 14, in particular in order to also permit simple fastening of the closure cap 16 on the wiper arm head 14. The closure cap 16, which has substantially a U-shaped cross section, has side walls 192, 193 which terminate flush with side surfaces 194, 195 of the wiper arm head 14.

Furthermore, it can be seen in particular from FIG. 21 that the two leadthroughs 181, 182 are arranged offset one behind the other in relation to a longitudinal axis 191 of the wiper arm head 14.

The second end region 179 has an eyelet 197 for forming a pivot axis 198. Furthermore, the means for guiding the cleaning hoses 31, 32 have two projections 201, 202 which, as viewed in the longitudinal direction, project beyond the eyelet 197 on the side situated opposite the first end region 178. Between the two projections 201, 202, there is arranged a bridging spring 203 which is bent into a C shape and which in turn is connected, on the side averted from the second end region 179, to a tension spring 205 by way of which the wiper arm rod 11 is pulled together with the wiper blade 1 in the direction of the vehicle window with a pressing force. The wiper arm head 14 has, below the eyelet 197, a guide channel 206 for the cleaning hose 31, 32, which guide channel guides the cleaning hose 31, 32 so as to be spaced apart from the eyelet 197. It is finally pointed out that the two leadthroughs 181, 182 are arranged within the lateral outer contour 185 of the wiper arm head 14.

The wiper device 100 thus described may be altered or modified in a variety of ways.

USE OF REFERENCE DESIGNATIONS

1 Wiper blade
2 Fastening arrangement

3 Spring tongue
4 Engagement button
5 Opening
10/a/b/c/d Wiper arm
11 Wiper arm rod
12 Pin
13 Sleeve
14 Wiper arm head
15 Through-opening
16 Closure cap
17 Wiper arm axis
18 Top side of the wiper arm rod
19 Side wall of the wiper arm rod
20 Side wall of the wiper arm rod
21 First mount region
22 Second mount region
30 Spray body
31 Cleaning hose
32 Cleaning hose
40/a/b/c/d Cleaning arrangement
41/a Front end face
42 First spray nozzle
43 First spray nozzle
45 Spray jet
46 Spray jet
47 Second spray nozzle
48 Second spray nozzle
49 Spray jet
50 Spray jet
51 Feed connector
52 Additional spray jet
53 Wiping direction
54/a/b/c/d Side wall
55/a/b/c/d Side wall
57 Through-opening
58 Additional mount region
59 Lug
60 Lug
61/a First mounting direction
62/a Second mounting direction
65 First guide means
66 Second guide means
67 Side wall
68 Side wall
71 First elevation
72 Second elevation
73 Bottom edge of the cleaning arrangement
74 Top edge of the cleaning arrangement
75 Depression
76 Depression
77 Movement play
78 Elongate depression
80 Starting position
81 End position
82 Opening
83 Axis of rotation
84 Delimiting surface of the depression
85 Delimiting surface of the depression
87 Engagement cam
88 Bayonet connection
89 Projection
90 Projection
91 Cutout
92 Cutout
93 End side
94 Rear side of a closure cap
95 Closure cap
96 Engagement connection
97 End face
98 Engagement connection
99 Engagement cam
100 Wiper device
101 Mounting direction
102 Engagement connection
103 Barb
105 Positively locking connection
106 Guide element
107 Guide element
108 Cutouts
109 Mounting direction
110 Engagement hook
115 Wiper blade body
116 Adapter element
117 Double arrow
118 Cutout
119 Cutout
120 Bottom side of the cleaning arrangement
121 Connecting duct
122 Curved section
124 Transverse connecting element
125 Transverse connecting element
130 Heating wire
131 Main body
132 Engagement hook
133 Counterpart engagement element
134 Counterpart engagement element
135 Branch
136 Longitudinal axis
137 Section
139 Mouth region
140 Connecting chamber
141 Feed port
142 Loop
143 Seal element
144 Seal compound
150 Engagement connection
151 Groove
152 Groove
153 Section
154 Section
155 Mount
156 Insertion slot
158 Non-circular region
159 Outer wall section
160 Outer wall section
161 Mount region
162 Spray nozzle
166 Air-guiding section
167 Air-guiding section
168 Underside of the wiper arm carrier
171 Transition region
172 Base section
173 Through-openings
174 Opening
178 First end region
179 Second end region
181 Leadthrough
182 Leadthrough
185 Outer contour of the wiper arm head
186 Opening
187 Top side of the wiper arm head
188 Bottom side of the wiper arm head
190 Guide projection
191 Longitudinal axis of the wiper arm head 192 Side wall of the closure cap
193 Side wall of the closure cap
194 Side surface of the wiper arm head
195 Side surface of the wiper arm head
197 Eyelet
198 Pivot axis
201 Projection
202 Projection
203 Bridging spring
205 Tension spring
206 Guide channel
A Spacing
B Width of the depressions
b Width
L Length
l Length
t Depth
w Opening width
Y Length
X Length
α Angle
β Angle
γ Angle

The invention claimed is:

1. A wiper device for cleaning vehicle windows, comprising:
   a wiper arm;
   a wiper blade able to be fastened to the wiper arm;
   a cleaning arrangement having at least one first spray nozzle for spraying a washing fluid, wherein the cleaning arrangement is connected directly with the wiper arm; and
   a fastening arrangement for connecting the wiper blade with the wiper arm wherein the cleaning arrangement is constructed as a separate component from the fastening arrangement for the wiper blade,
   wherein the separate component which forms the cleaning arrangement is constructed to hold the fastening arrangement for the wiper blade,
   wherein the cleaning arrangement and the fastening arrangement for the wiper blade are arranged, at least in certain areas, within a mount of the wiper arm, and
   wherein the cleaning arrangement has a mount region for the fastening arrangement, such that in a mounted state of the cleaning arrangement, the mount of the wiper arm encompasses the cleaning arrangement, and the mount region of the cleaning arrangement encompasses the fastening arrangement of the wiper blade, at least in certain areas, and
   wherein the fastening arrangement and the cleaning arrangement have complementary guiding means to form a guide between the fastening arrangement and the cleaning arrangement during a mounting of the fastening arrangement to the cleaning arrangement by moving the fastening arrangement inside of the cleaning arrangement in a first mounting direction followed by moving the fastening arrangement inside of the cleaning arrangement in a second mounting direction which is different from the first mounting direction.

2. The wiper device according to claim 1, wherein at least one second spray nozzle is provided, which is arranged on a side wall, different from an end face, or on an underside of the cleaning arrangement.

3. The wiper device according to claim 2, wherein the cleaning arrangement has two of the second spray nozzles, one of the two second spray nozzles is on the side wall, and the other of the two second spray nozzles is on a second side wall opposite the side wall.

4. The wiper device according to claim 2, wherein the first and/or second spray nozzle are constructed to produce a spray jet, the washing fluid of which, viewed in a wiping direction of the wiper blade, strikes onto the vehicle window before or respectively after the wiper blade.

5. The wiper device according to claim 1, wherein the cleaning arrangement has side walls which are arranged partially flush with side walls of the mount of the wiper arm.

6. The wiper device according to claim 1, wherein an end face of the cleaning arrangement, in the mount region of which the at least one first spray nozzle is arranged, is constructed symmetrically to a centre plane of the cleaning arrangement, and wherein there are at least two of the first spray nozzles provided which are arranged symmetrically to the centre plane.

7. The wiper device according to claim 1, wherein the cleaning arrangement has a through-opening, which in the mounted state of the wiper blade is penetrated by an engagement element of the fastening arrangement, wherein the engagement element cooperates with an opening on the wiper arm.

8. The wiper device according to claim 1, wherein the cleaning arrangement is constructed to be connected with an elongated spray body, said spray body comprising at least two cleaning hoses on which are arranged additional spray openings.

9. The wiper device according to claim 1, wherein the cleaning arrangement does not project laterally over a cross-section of the wiper arm in the mount region.

10. The wiper device according to claim 1, wherein the at least one first spray nozzle is arranged in the mount region of the free end of the wiper arm on an end face of the cleaning arrangement, pointing away from the wiper arm.

11. The wiper device according to claim 1, wherein the wiper arm has the mount, having an at least substantially U-shaped cross-section, with two parallel side walls.

12. A cleaning arrangement for a wiper device for cleaning vehicle windows, comprising:
   at least one first spray nozzle for spraying a washing fluid, whereby the cleaning arrangement is connected directly with a wiper arm,
   wherein the cleaning arrangement has a mount region inside which a fastening arrangement of a wiper blade is mounted,
   wherein the cleaning arrangement and the fastening arrangement for the wiper blade are arranged, at least in certain areas, within a mount of the wiper arm,
   wherein when the cleaning arrangement is in a mounted state the mount of the wiper arm encompasses the cleaning arrangement, and the mount region of the cleaning arrangement encompasses the fastening arrangement of the wiper blade, at least in certain areas, and
   wherein the fastening arrangement and the cleaning arrangement have complementary guiding means to form a guide between the fastening arrangement and the cleaning arrangement during the mounting along two perpendicular mounting directions.

13. The cleaning arrangement according to claim 12, wherein the mount region has a through-opening for the reception of the fastening arrangement.

14. A wiper device for cleaning vehicle windows, comprising:
   a wiper arm;

a wiper blade able to be fastened to the wiper arm;
a cleaning arrangement having at least one first spray nozzle for spraying a washing fluid, wherein the cleaning arrangement is connected directly with the wiper arm; and
a fastening arrangement for connecting the wiper blade with the wiper arm wherein the cleaning arrangement is constructed as a separate component from the fastening arrangement for the wiper blade,
wherein the fastening arrangement and the cleaning arrangement have complementary guiding means to form a guide between the fastening arrangement and the cleaning arrangement during a mounting along two perpendicular mounting directions, and
wherein the mounting allows the cleaning arrangement to encompass the fastening arrangement of the wiper blade.

\* \* \* \* \*